United States Patent [19]
Minami et al.

[11] Patent Number: 6,040,080
[45] Date of Patent: Mar. 21, 2000

[54] BATTERY TRAY

[75] Inventors: Hiromasa Minami; Masaru Igarashi; Takahiro Chiku, all of Hamamatsu, Japan

[73] Assignee: Suzuki Motor Corporation, Hamamatsu, Japan

[21] Appl. No.: 08/980,228

[22] Filed: Nov. 28, 1997

[30] Foreign Application Priority Data

Nov. 27, 1996 [JP] Japan ................................. 8-315827

[51] Int. Cl.⁷ ............................ H01M 2/02; H01M 2/10
[52] U.S. Cl. ................... 429/96; 429/98; 429/100
[58] Field of Search ................ 429/96, 100, 122

[56] References Cited

U.S. PATENT DOCUMENTS

| | | | |
|---|---|---|---|
| 3,584,758 | 6/1971 | Moore | 220/21 |
| 3,616,112 | 10/1971 | Desai | 161/37 |
| 3,661,646 | 5/1972 | Barrett | 136/79 |
| 3,821,997 | 7/1974 | Sieren | 180/68.5 |
| 4,317,497 | 3/1982 | Alt | 180/68.5 |
| 4,343,846 | 8/1982 | Kohn | 428/138 |
| 4,801,483 | 1/1989 | Beckerman et al. | 428/71 |
| 5,016,395 | 5/1991 | Walker | 49/501 |
| 5,280,066 | 1/1994 | Tekkanat et al. | 525/64 |
| 5,618,604 | 4/1997 | Dohn | 428/72 |
| 5,636,701 | 6/1997 | Norman | 180/68.5 |
| 5,672,309 | 9/1997 | Masui et al. | 264/257 |
| 5,690,378 | 11/1997 | Romesburg | 296/181 |

FOREIGN PATENT DOCUMENTS 8186390  7/1996  Japan .

*Primary Examiner*—Maria Nuzzolillo
*Assistant Examiner*—Mark Ruthkosky
*Attorney, Agent, or Firm*—Jacobson, Price, Holman & Stern,, PLLC

[57] ABSTRACT

A battery tray made of a composite FRP member having a structure such that reinforcing fibers are disposed on the two vertical ends of a balsa member and composite-molded with resin by press molding, and having a bottom floor portion, wall portions and a pair of flange portions, wherein the balsa member is disposed in the bottom floor portion.

5 Claims, 11 Drawing Sheets

BATTERY TRAY

BACKGROUND OF THE INVENTION

The present invention relates to a battery tray for supporting batteries for driving an electric vehicle.

Hitherto, an electric vehicle has batteries so as to be driven, the batteries being mounted in the interior space thereof or under the floor of the car body.

If the batteries for driving the vehicle are mounted in the interior space of the vehicle, the interior space of the vehicle is reduced undesirably.

In a case where the batteries are disposed under the floor with a battery tray manufactured by an iron material, the battery tray must have a great floor thickness in order to realize required strength. As a result, the minimum road clearance is affected. Since the iron material requires a jig when the battery tray is mounted, the cost cannot be reduced. Moreover, since a large number of portions of the battery tray must be welded, distortion or the like causes dimension errors to probably take place. Moreover, the manufactured battery tray has excessively heavy weight.

In a case where an Al honey-comb is employed to manufacture a battery tray which is disposed under the floor, the weight and the floor thickness of the battery tray can be reduced. However, the Al honey-comb has a possibility of electric erosion when mounted on an iron frame. Since the Al honey-comb cannot considerably withstand shocks, it is unsuitable to be disposed under the floor which is frequently hit by stones. What is worse, the cost of the Al honey-comb is very high and a great cost is required to machine the same.

In a case where FRP (Fiber Reinforced Plastic) is employed to manufacture a battery tray to be disposed under the floor, the weight is enlarged considerably to support the battery tray. To solve the problem above by reducing the weight, a considerably complicated structure is required, thus resulting in the cost being enlarged excessively.

SUMMARY OF THE INVENTION

Accordingly, an object of the present invention is to provide a battery tray, the total cost of which can be reduced and with which satisfactory strength can be obtained.

The battery tray according to the present invention comprises a combined FRP member molded such that a balsa member and fiber reinforced plastic are composite-molded with resin.

It is preferable that the battery tray according to the present invention comprises a bottom floor portion, wall portions and a pair of flange portions, wherein a balsa member is disposed in the bottom floor portion. That is, the floor portion is formed into a sandwich structure in which the balsa member is held between fiber reinforced plastic (FRP).

It is preferable that the flange portions, which are portions except the floor portion, are made of only FRP such that an FRP layer above the balsa member and an FRP layer below the balsa member overlap.

It is preferable that the battery tray according to the present invention is integrally molded by using convex and concave molds. Preferably, a fiber layer to be disposed below the balsa member is initially set on the concave mold. Then, the balsa member is set, followed by setting the fiber layer to be disposed on the balsa member. Then, synthetic resin in a required quantity is injected on the fiber layer to be disposed on the balsa member so as to be pressed at predetermined pressure, at a predetermined temperature and for a predetermined time period. As a result, the fiber layer is impregnated with the synthetic resin. As a result, the battery tray can be manufactured. In a preferred embodiment, a metal net is used.

Although the fiber layer includes a type, in which fibers are aligned in one direction and a type in which the fibers are woven in various directions, FRP having specifications required for the subject portion is arbitrarily set. Thus, partial reinforcement and the like can easily be performed.

It is preferable that the battery tray according to the present invention is, through the above-mentioned flange portions, mounted on side frames disposed at the right-hand portion and the left-hand portion of the lower surface of the floor portion of the vehicle. It is preferable that the battery tray according to the present invention is in the form of a ship-like shape having a floor corresponding to the bottom portion of the ship-shape, the floor being arranged to mount a battery. It is preferable that the flange portion is continuously formed at the edge portions of the bottom of the ship-like shape.

In the present invention, the above-mentioned reinforcing fiber is polyester in particular polyarylate, polyamide in particular aramide fiber, polyacrylonitrile fiber and polyolefine in particular synthetic resin of fibers called high polymeric polyethylene, natural fiber, such as cotton and hemp, inorganic fiber, such as glass fiber, carbon fiber, alumina fiber and silicon carbide fiber and their mixture.

Although the foregoing synthetic resin may be either of thermosetting resin or thermoplastic resin, it is preferable that unset thermosetting resin be employed in many cases. The foregoing resin includes epoxy resin, unsaturated polyester resin, vinylester resin, phenol resin and hardening cycloolefin.

In a preferred embodiment, the battery is secured to the floor such that retainer for the battery or the holder base is secured to the floor with bolts and so forth.

A nut is attached such that a hole is formed in the floor to receive a T-nut which secures the lower-end of the bolt so that the nut is secured. In another embodiment, the nut may be structured such that a rivet nut is attached in a hole formed in the upper surface of an FRP square pipe secured to the floor in the direction of the width of the floor. The square pipe is able to serve as a reinforcing member for the battery tray in the direction of the width of the vehicle and also serve as a spacer between batteries in the lengthwise direction of the vehicle. The nut may be structured such that an iron square pipe is secured in place of the FRP square pipe and a tap hole is formed in the square pipe.

In a case where the strength of the FRP flange portion is insufficient against clamping with bolts, a reinforcing member, such as an iron plate, is attached to the flange portion with an adhesive agent or the like so that the strength is improved.

It is preferable that spacers are interposed at the gaps among batteries in the direction of the width of the vehicle so as to prevent looseness of the batteries in the direction of the width of the vehicle. In the embodiment in which the square pipes are attached, the batteries can be located also in the lengthwise direction of the vehicle.

According to the present invention, the battery tray is disposed under the floor of the vehicle so that the living space can be maintained. In addition, use of the composite member of the reinforcing member and balsa member enables the thickness of the floor to be reduced, deflection of the floor surface to be prevented and weight to be reduced when the batteries are supported. Therefore, the driving performance can be stabilized and improved. Moreover, the cost of the material can be reduced. Since molds are used to integrally mold the battery tray without any jig, the cost can be reduced, the time required to manufacture the battery tray can be shortened and dimension errors can be prevented. Since the materials for forming the battery tray according to the present invention are materials having no electrical conductivity, a preferable effect can be obtained.

DESCRIPTION OF THE PREFERRED EMBODIMENTS

Figure 1:
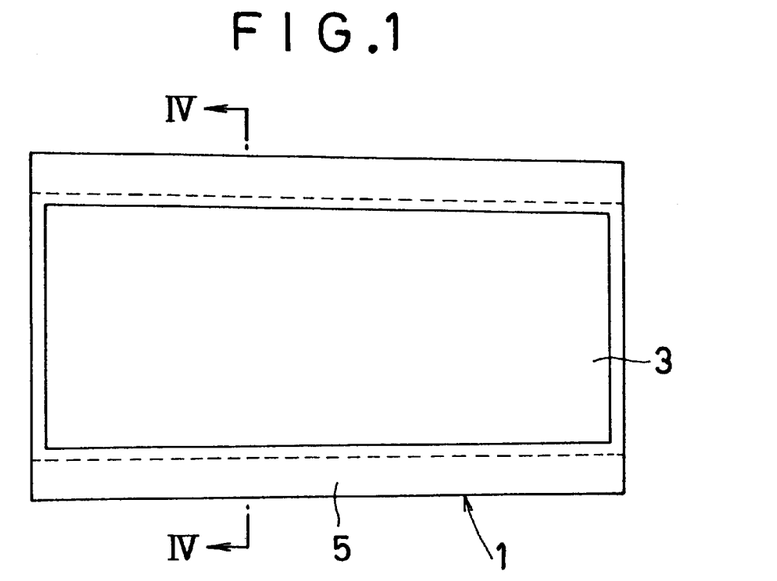
FIG. 1 is a plan view showing a battery tray according to an embodiment of the present invention.
Figure 2:
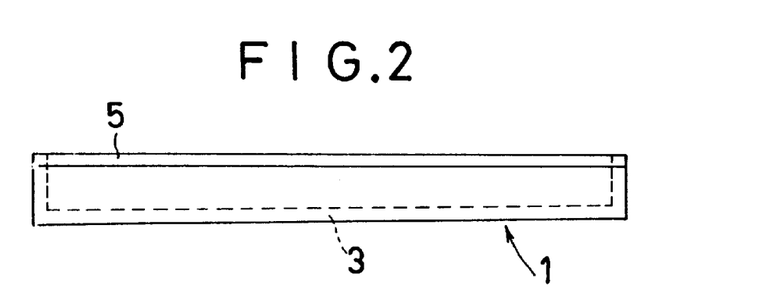
FIG. 2 is a front view showing the battery tray according to the embodiment of the present invention.
Figure 3:
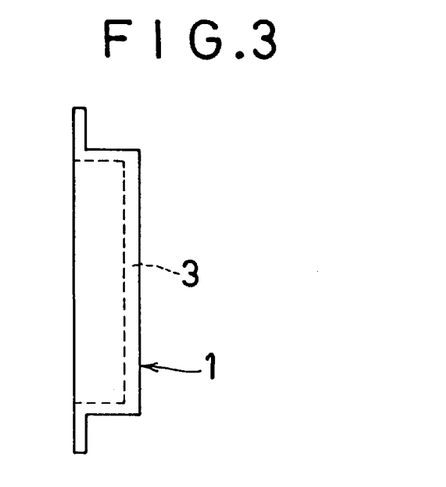
FIG. 3 is a side view showing the battery tray according to the embodiment of the present invention.

FIGS. 1 to 3 are diagrams showing an embodiment of a battery tray according to the present invention. The battery tray 1 according to this embodiment is in the form of a ship-like shape having a floor 3 corresponding to the bottom portion of the ship-shape, the floor 3 being arranged to mount a battery and having a flange portion 5 at the end portions with which the battery tray 1 is secured to the car body.

Figure 4:
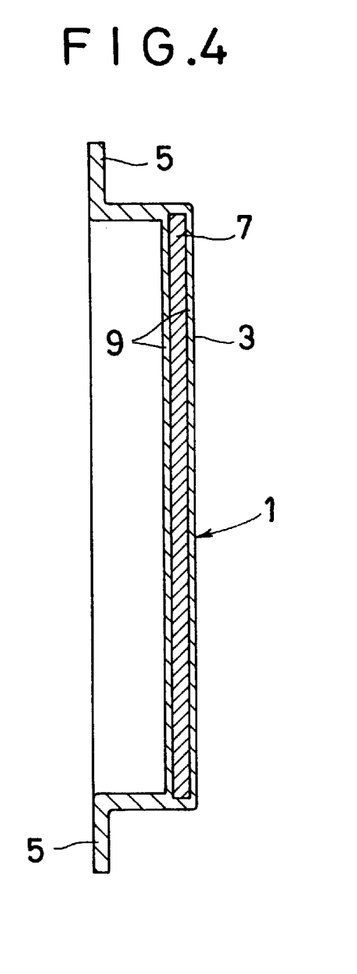
FIG. 4 is a cross sectional view taken along line IV—IV shown in FIG. 1 and showing the battery tray according to the embodiment of the present invention.

As shown in FIG. 4, the battery tray 1 has the floor 3 formed into a sandwich structure formed such that a balsa member 7 is, as shown in FIG. 4, held between fiber glass members 9 which are fiber reinforced plastics (FRP).

Figure 5:
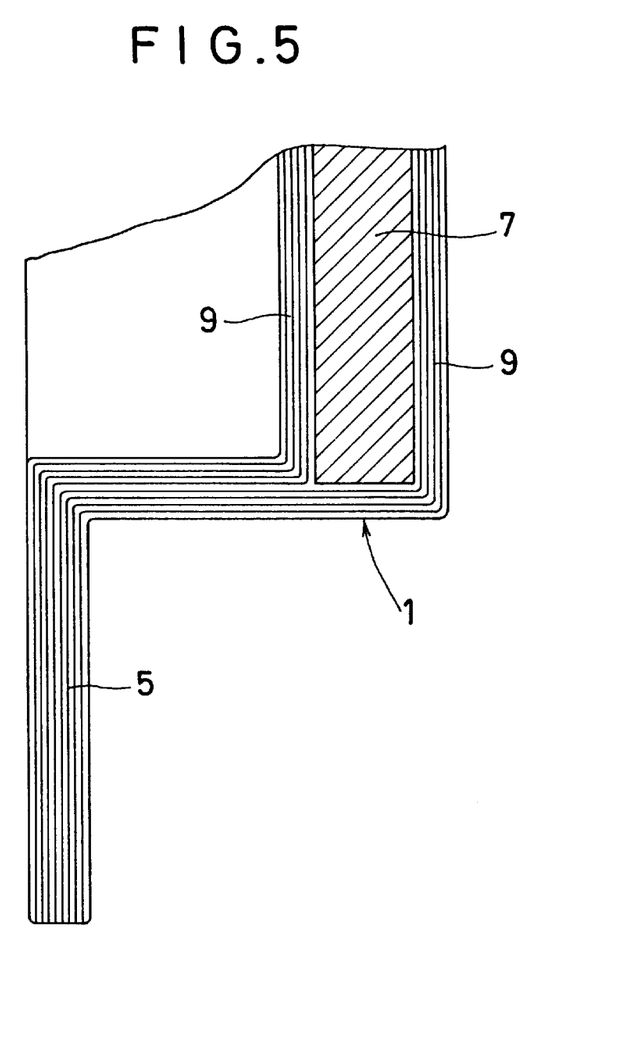
FIG. 5 is a partially enlarged cross sectional view taken along line IV—IV shown in FIG. 1 and showing the battery tray according to the embodiment of the present invention.

A flange portion 5 except the floor is made by only FRP but includes fibers arranged such that an upper FRP layer 9 and a lower FRP an layer 9 of the balsa member 7 overlap, as shown in FIG. 5.

A method of manufacturing the battery tray according to this embodiment will now be described.

Figure 6:
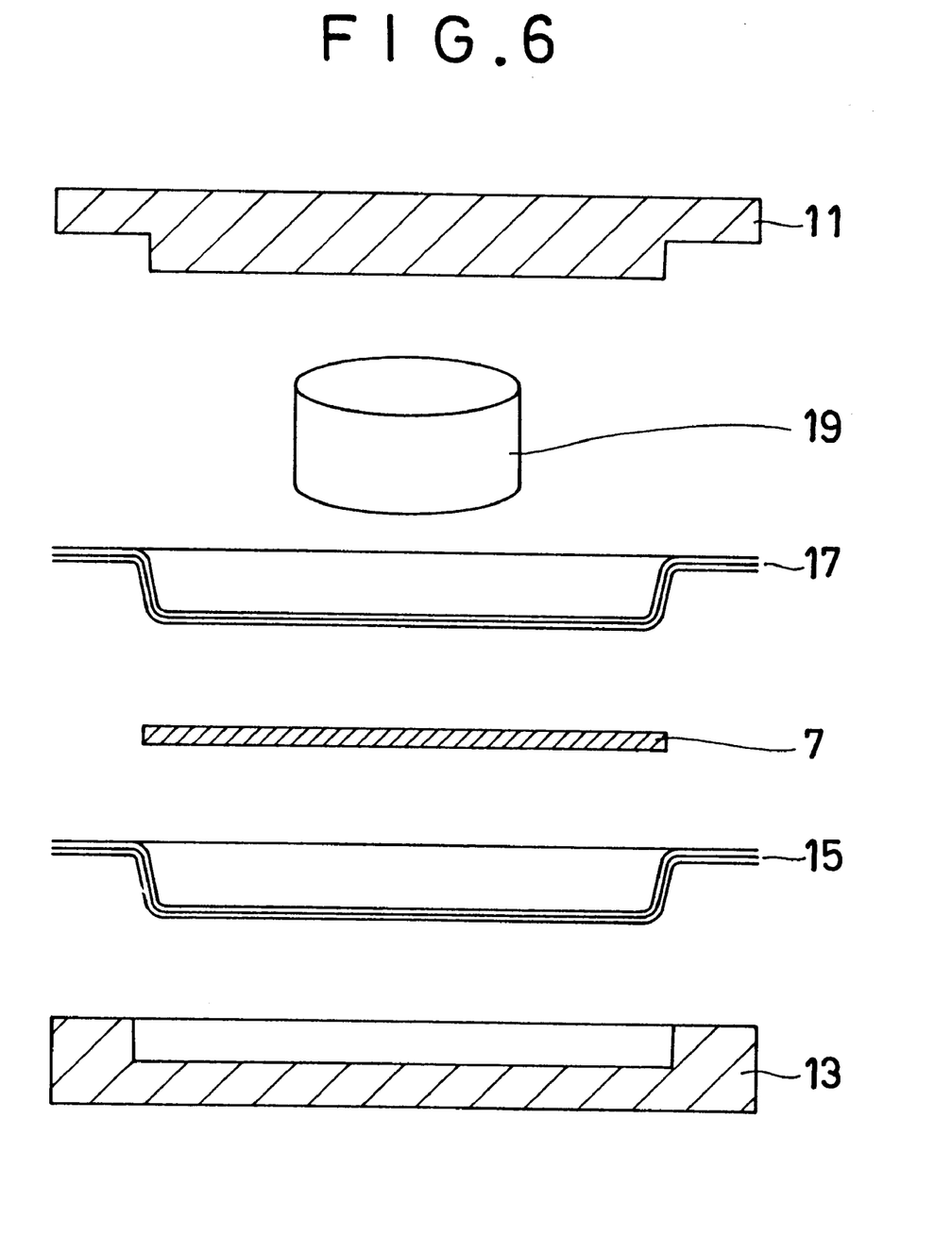
FIG. 6 is a schematic view showing a method of manufacturing the battery tray according to the embodiment of the present invention.

As shown in FIG. 6, a convex mold 11 and a concave mold 13 are used so that the battery tray is integrally molded. Initially, a fiber layer 15 to be disposed below the balsa member 7 is set on the concave mold 13. Then, the balsa member 7 is set. Then, a fiber layer 17 to be disposed on the balsa member 7 is set, followed by injecting synthetic resin 19 in a required quantity onto the fiber layer 17 so as to be pressed under predetermined pressure and at a predetermined temperature for a predetermined time period. As a result, the fiber layers 15 and 17 are impregnated with the synthetic resin 19. Thus, the battery tray shown in FIGS. 1 to 3 can be manufactured.

Since the battery tray is integrally molded:by using the molds as described above, the battery trays can be uniformly manufactured by a simple manufacturing method in a short time with a low manufacturing cost.

Although the fiber layer includes a type in which the fibers are aligned in one direction and a type in which the fibers are woven in various directions, fiber layer having specifications required for the subject portion is arbitrarily set. Thus, partial reinforcement and the like can easily be performed.

Figure 7:
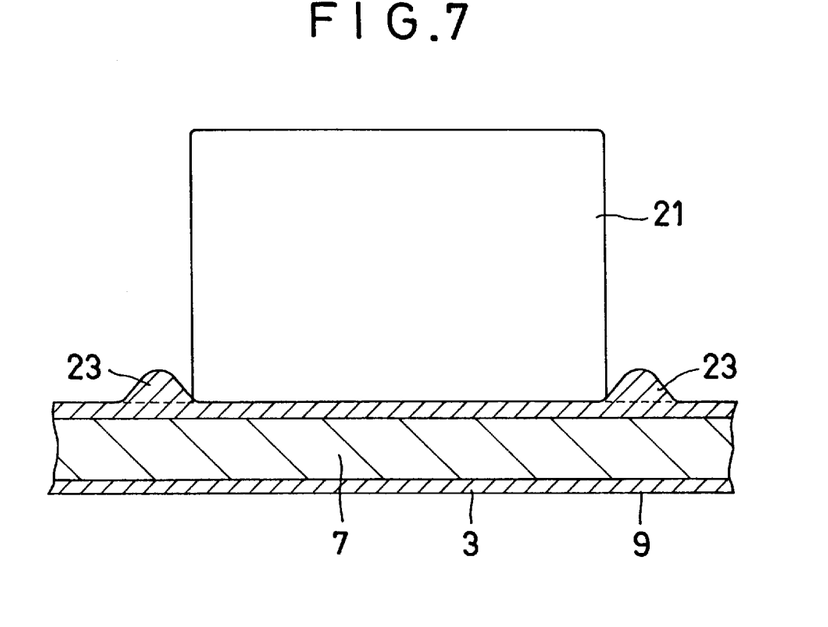
FIG. 7 is a side view showing a state in which the battery is placed on the battery tray according to the embodiment of the present invention.

Even in a case where small ribs 23 for locating a battery 21 are formed as shown in FIG. 7, the ribs 23 can easily be formed by simply and slightly modifying the molds without any influences on the labor required to mold the battery tray or the time taken to complete the molding operation. Also the flange portion to be secured to the car body can be modified to be adaptable to the car body by simply changing the molds.

Figure 8:
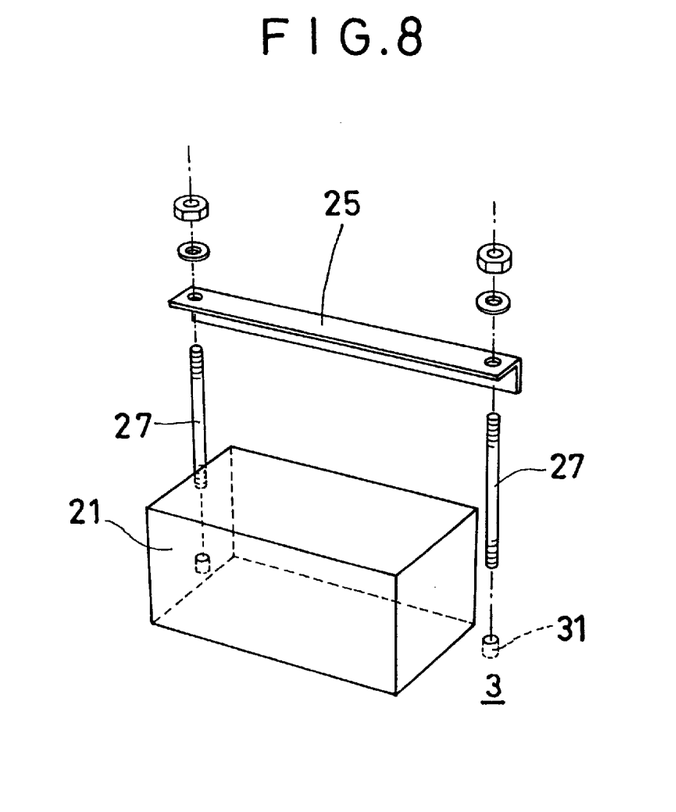
FIG. 8 is a perspective view showing a state where the battery is secured to the battery tray according to the embodiment of the present invention.

When the battery 21 is secured to the floor as shown in FIG. 8, a retainer 25 for retaining the battery 21 must be secured to a floor 29 by bolts 27 and so forth. Therefore, nuts 31 are required for the floor 3.

Figure 9:
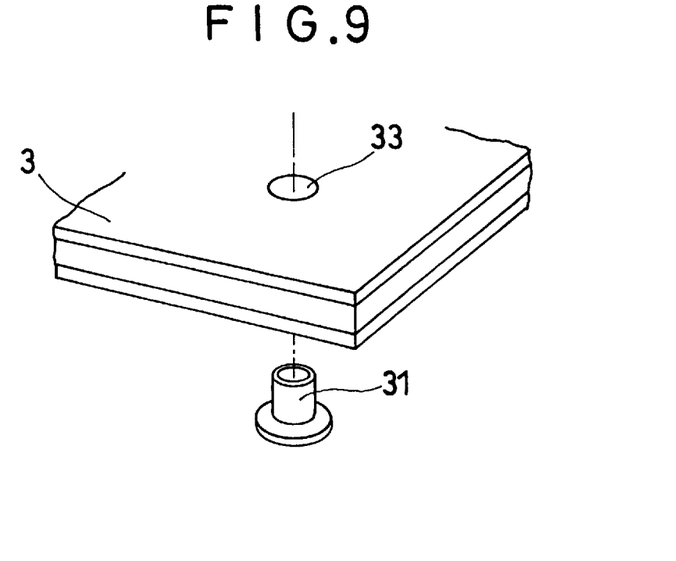
FIG. 9 is a perspective view showing an embodiment of a method of mounting a nut for securing the lower end of a battery fixing bolt.

A method of attaching the nut 31 to the floor 3 is shown in FIG. 9. With this method, a hole 33 is formed in the floor 3, and a T-nut 31 is inserted into the hole 33 so that the lower end of a bolt 27 is secured with the nut 31.

Figure 10:
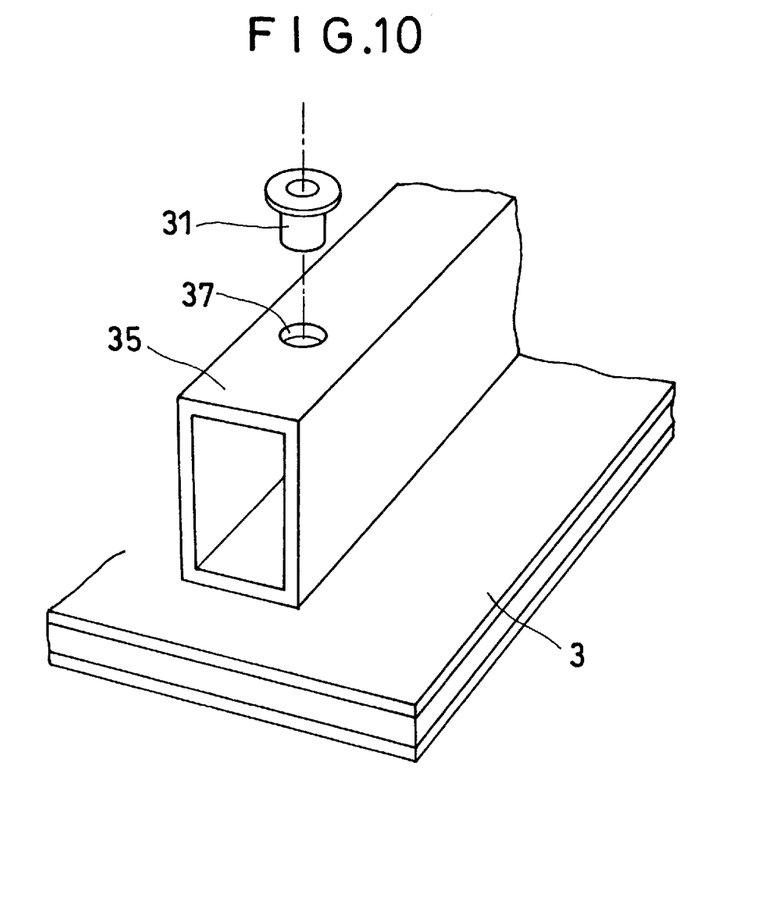
FIG. 10 is a perspective view showing another embodiment of a-method of mounting the nut for securing the lower end of the battery fixing bolt.

FIG. 10 shows another embodiment for mounting the nut 31. In this embodiment, an FRP square pipe 35 is, by an adhesive agent, secured to the floor 3, the FRP square pipe 35 being secured in the direction of the width of the vehicle. A hole 37 is formed on the upper surface of the pipe 35 to receive a rivet nut 31. The square pipe 35 is able to serve as a member for reinforcing the strength of the battery tray in the direction of the width of the vehicle and also serve as a spacer between batteries 21 in the lengthwise direction of the vehicle body.

Figure 11:
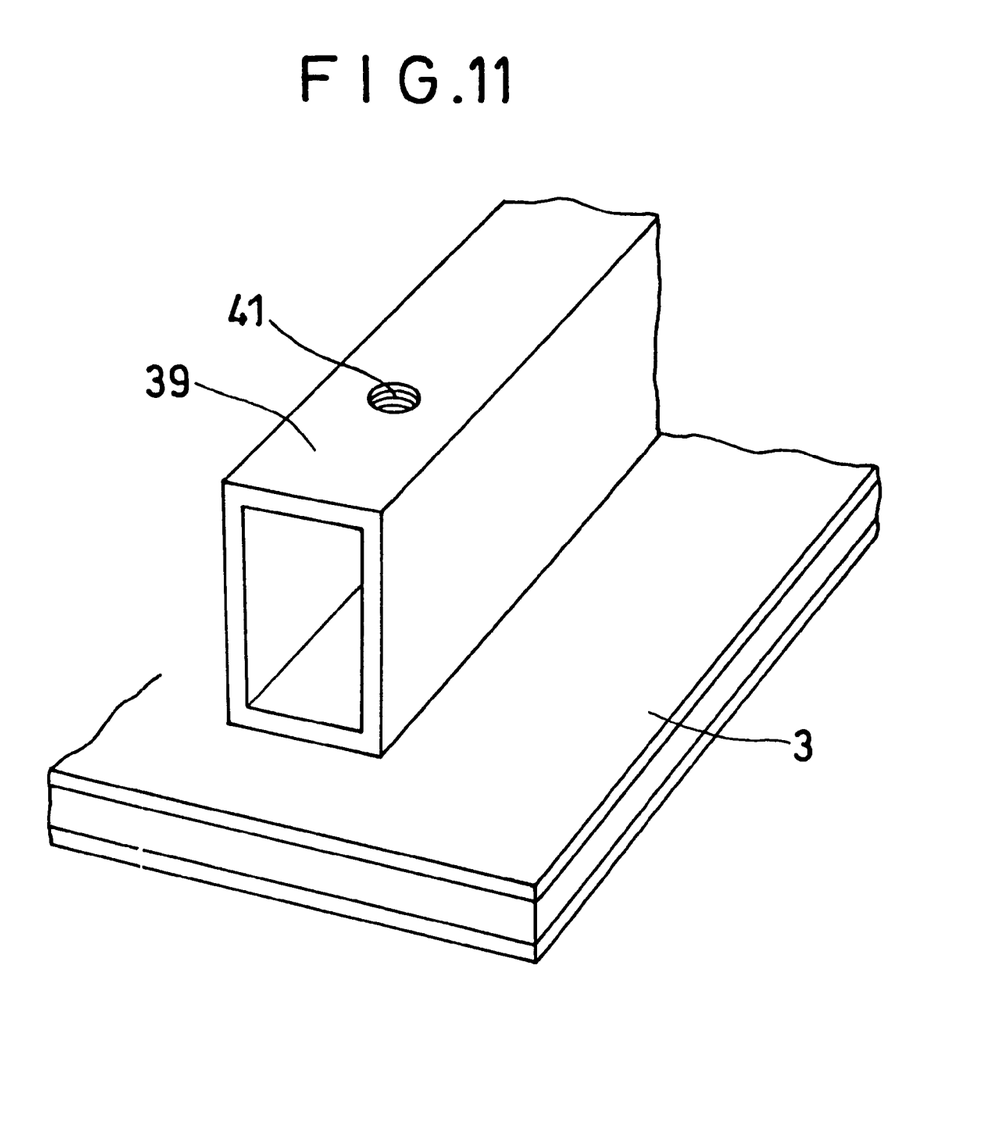
FIG. 11 is a perspective view showing another embodiment of a method of mounting the nut for securing the lower end of the battery fixing bolt.

FIG. 11 shows another embodiment for mounting the nut 31. In place of the FRP square pipe 35 shown in FIG. 10, an iron square pipe 39 is secured, and a hole 41 is formed in the square pipe 39, followed by performing a tapping process.

Figure 12:
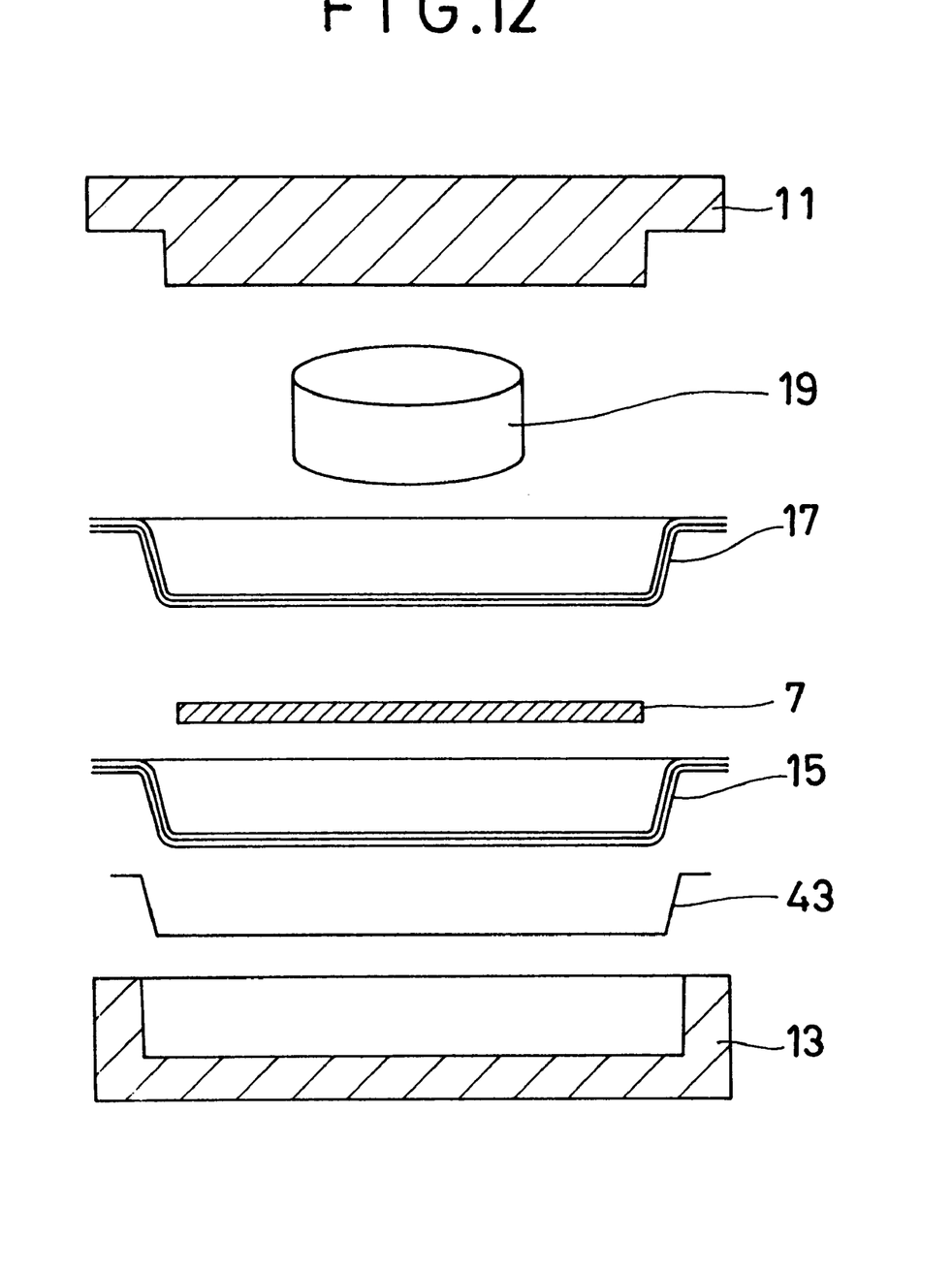
FIG. 12 is a schematic view showing another method of manufacturing the battery tray according to another embodiment of the present invention.

In a case where required strength cannot be realized by only a member obtained by combining the FRP and the balsa member with each other, a metal net 43 is, as shown in FIG. 12, used when the pressing process is performed by using the molds 11 and 13. As a result, the strength can be improved without enlargement of the thickness of the floor 3.

The method shown in FIG. 12 is performed such that the metal net 43 is set on the concave mold 13, and then the fiber layer 15 to be disposed below the balsa member 7 is set. Then, the balsa member 7 is set, followed by setting the fiber layer 17 to be disposed on the balsa member 7. Then, the synthetic resin is injected in a required quantity onto the fiber layer 17 so as to be pressed under predetermined pressure and at a predetermined temperature for a predetermined time period. As a result, the fiber layers 15 and 17 and the metal net 43 are impregnated with the synthetic resin 19.

As a result, the battery tray can be molded.

Figure 13:
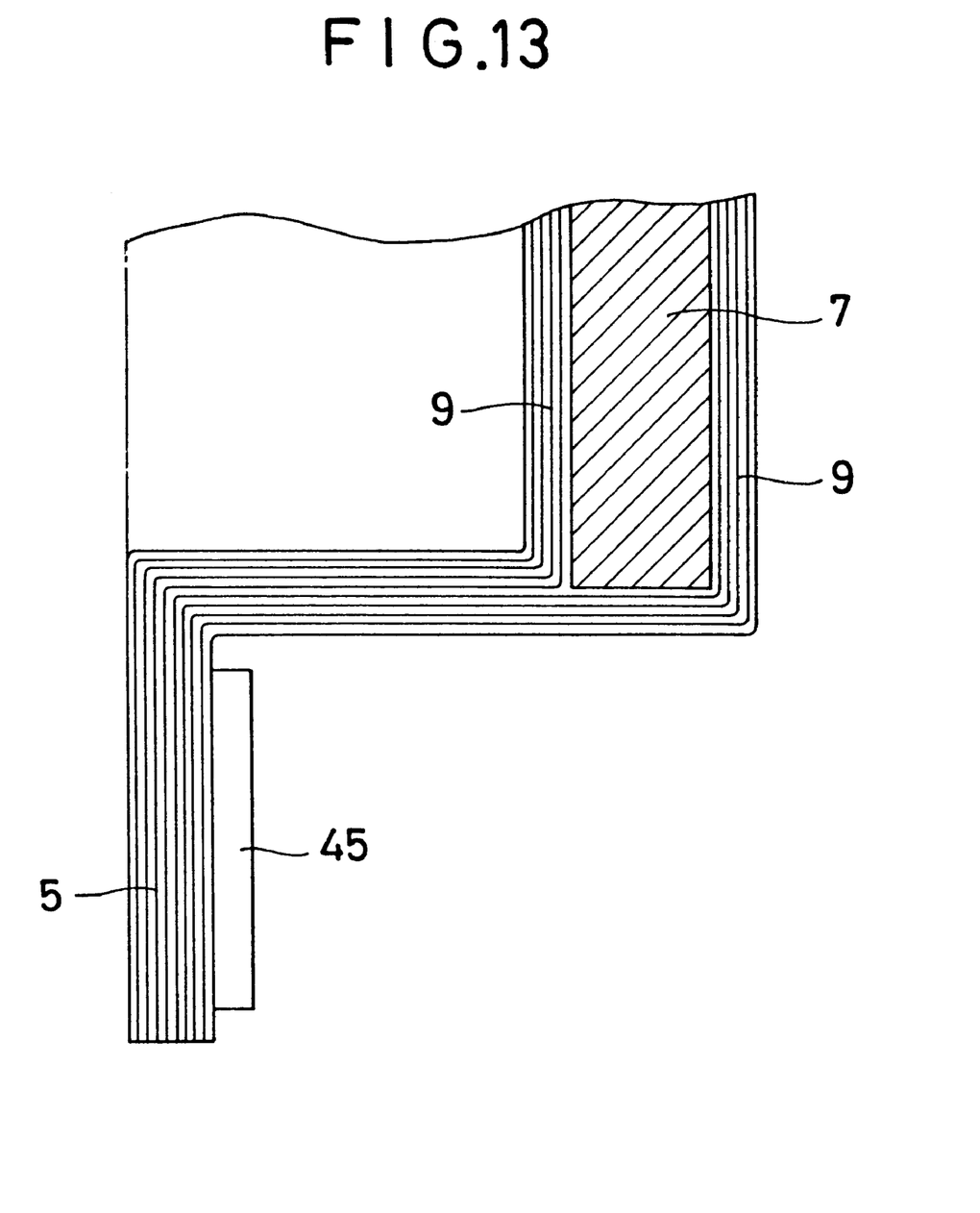
FIG. 13 is a partially enlarged cross sectional view taken along line IV—IV shown in FIG. 1 for showing the battery tray according to another embodiment of the present invention.

In a case where the strength of the FRP flange portion shown in FIG. 5 is insufficient against, for example, clamping with the bolts, an iron plate 45 and so forth are attached with an adhesive agent, as shown in FIG. 13. Thus, the strength can be improved.

Figure 14:
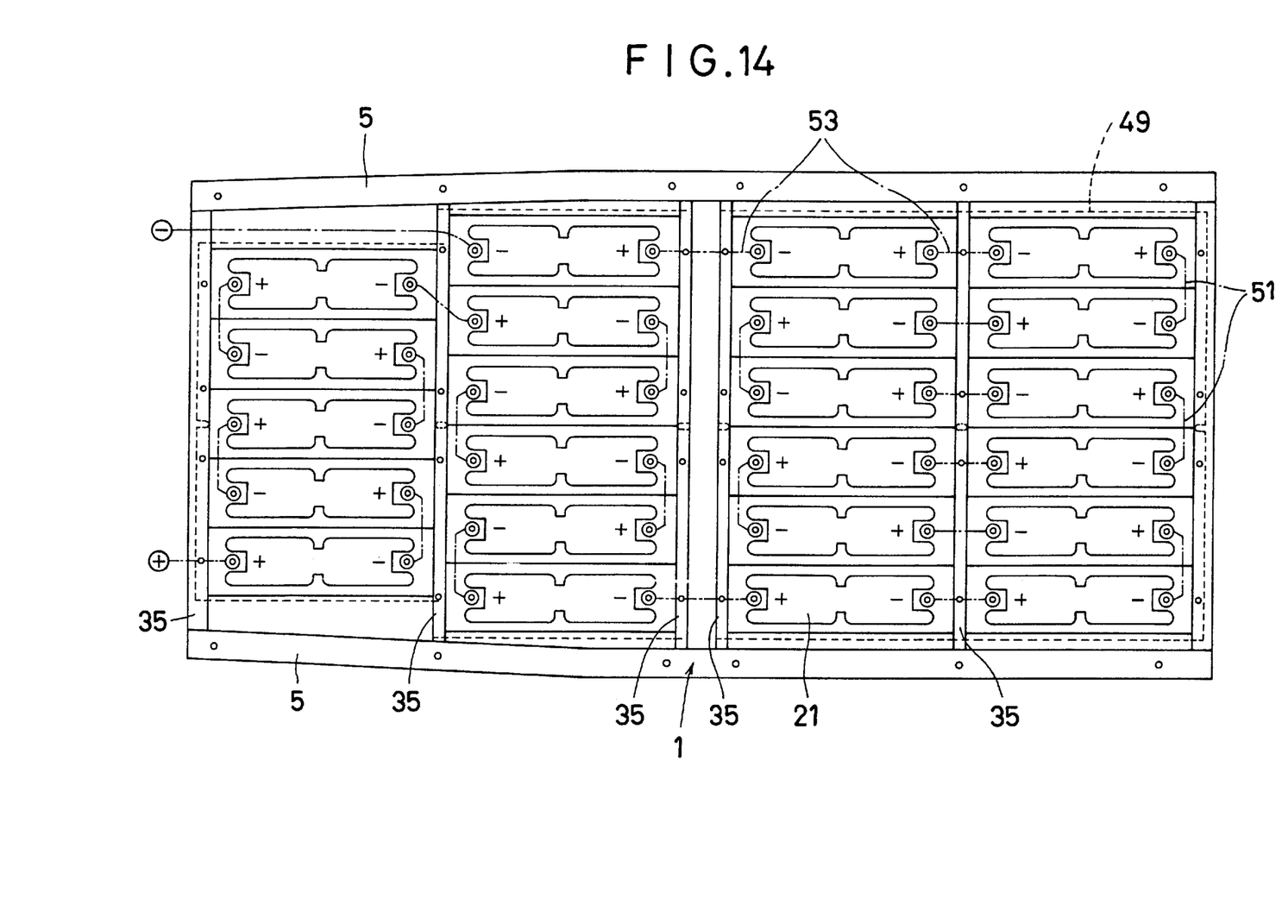
FIG. 14 is a plan view showing a state where the battery is secured to the battery tray according to the embodiment of the present invention.

FIG. 14 shows a state where 23 batteries 21 have been accommodated and secured by using the battery tray according to the present invention. A short dashed line indicates a holder base 49 in the form of a plate-like shape. In this embodiment, the batteries 21 are disposed to forwards and backwards form four lines. A holder base 49 to which five batteries 21 are assigned is disposed in the frontmost line, while a holder base 49 to which six batteries 21 are assigned is disposed for three following lines. Each battery 21 is connected as indicated by a dashed line. The batteries 21 adjacent in the direction of the width of the vehicles are connected to each other by the connectors 51, while the batteries 21 adjacent in the lengthwise direction of the vehicle are connected to each other through a cable 53. Spacers (not shown) are interposed at the gaps among the batteries adjacent in the lengthwise direction of the vehicle to prevent looseness of the batteries in the direction of the width of the vehicle. Since the above-mentioned square pipes 35 (or 39) are attached, the batteries 21 can be located also in the lengthwise direction of the vehicle.

Figure 15:
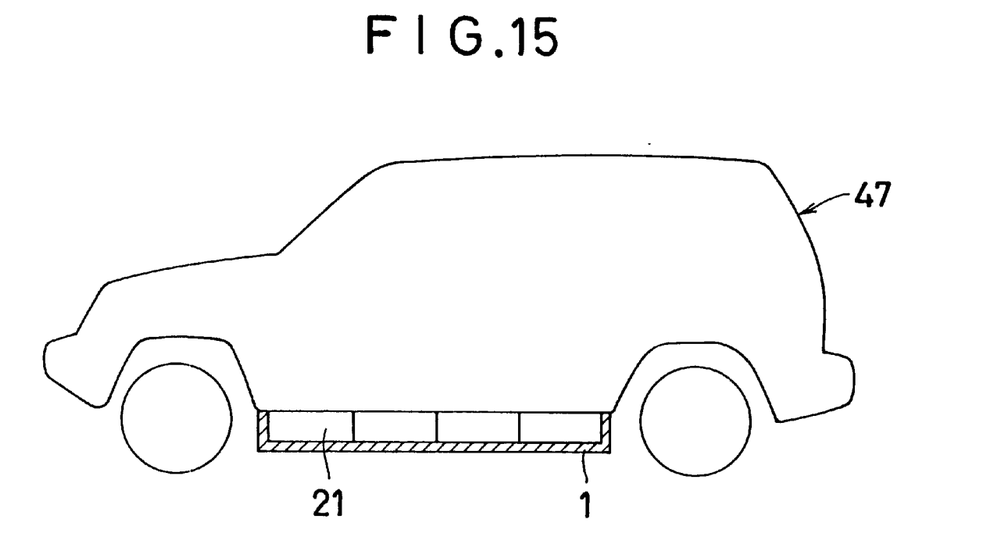
FIG. 15 is a schematic view showing a vehicle having the battery tray according to the embodiment of the present invention.
Figure 16:
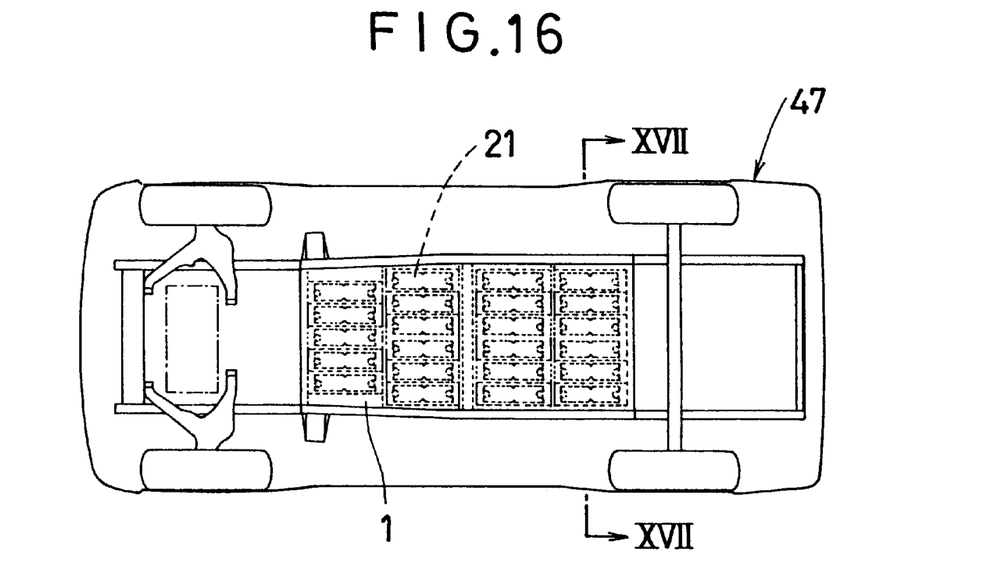
FIG. 16 is a schematic plan view showing the vehicle having the battery tray according to the embodiment of the present invention.

FIGS. 15 and 16 schematically showing an electric vehicle having the battery tray according to the present invention. The electric vehicle 47 in this case has a battery tray 1 in the lower portion thereof.

Figure 17:
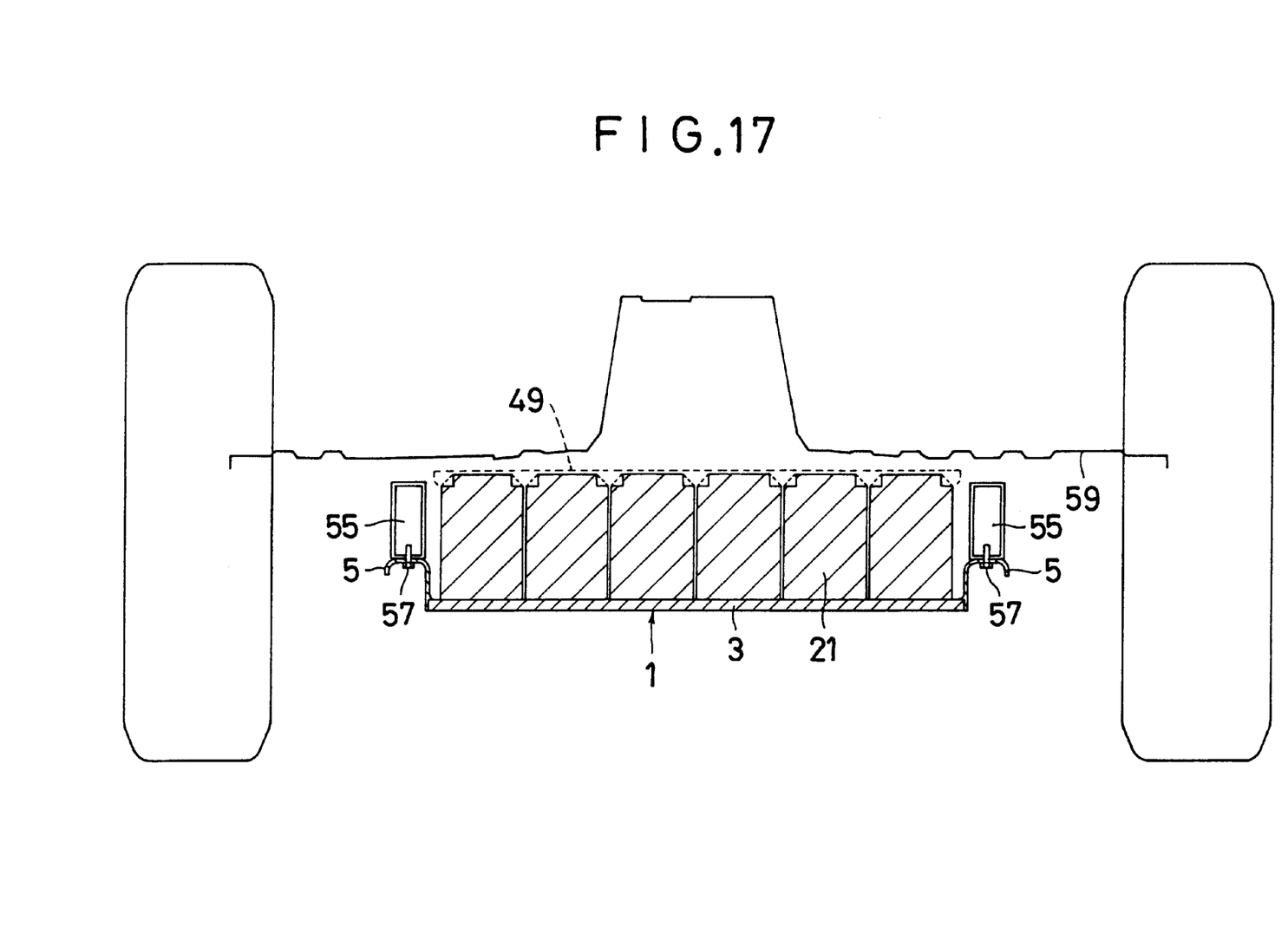
FIG. 17 is a cross sectional view taken along line XVII—XVII shown in FIG. 16 and showing the vehicle having the battery tray according to the embodiment of the present invention.

The battery tray 1 is, as shown in FIG. 17, secured to the lower portion of a vehicle body 59 such that a flange portion 5 of the battery tray 1 is secured to a side frame 55 with bolts 57.

Many other variation and modification of the invention will be apparent to those skilled in the art without departing from the spirit and scope of the invention. The above-described embodiments are, therefore, intended to be merely exemplary, and all such variations and modifications are intended to be included within the scope of the invention as defined in the appended claims.

The entire disclosure of Japanese Patent Application No. 8-315827 filed on Nov. 27, 1996 including specification, claims, drawings and summary are incorporated herein by reference in its entirety.

We claim:

1. A battery tray for supporting an electric battery, said battery tray comprising a combined FRP member molded such that a balsa member, a metal net and fiber reinforced plastic are composite-molded with resin.

2. A battery tray according to claim 1, wherein said fiber reinforced plastic is fiber glass.

3. A battery tray for supporting an electric battery, said battery tray comprising a balsa member, a metal net and reinforcing fibers, said reinforcing fibers being disposed on two vertical ends of said balsa member, wherein said battery tray is composite-molded with resin by press molding.

4. A battery tray for supporting an electric battery, said battery tray comprising a bottom floor portion, wall portions and a pair of flange portions, wherein a balsa member and a metal net are disposed in said bottom floor portion.

5. A battery tray according to claim 3, wherein said metal net underlies said balsa member.

* * * * *